United States Patent
Stanczyk (12)

(10) Patent No.: US 7,021,270 B1
(45) Date of Patent: Apr. 4, 2006

(54) CONNECTING ROD AND CRANKSHAFT ASSEMBLY FOR AN ENGINE

(76) Inventor: Dan Stanczyk, R.R.2, Box 31, Ashton, NE (US) 68817

( * ) Notice: Subject to any disclaimer, the term of this patent is extended or adjusted under 35 U.S.C. 154(b) by 0 days.

(21) Appl. No.: 11/126,969

(22) Filed: May 11, 2005

(51) Int. Cl.
*F02B 75/32* (2006.01)
(52) U.S. Cl. .................... 123/197.3; 74/579 E
(58) Field of Classification Search .......... 123/197.1, 123/197.3; 74/579 E
See application file for complete search history.

(56) References Cited

U.S. PATENT DOCUMENTS

| 1,248,250 | A | * | 11/1917 | Bohler | 123/197.4 |
| 1,786,934 | A | * | 12/1930 | Briggs | 74/579 E |
| 2,194,022 | A | | 3/1940 | Kitzeman | 123/53 |
| 4,463,710 | A | | 8/1984 | McWhorter | 123/48 B |
| 4,974,554 | A | | 12/1990 | Emery | 123/48 B |
| 5,156,121 | A | | 10/1992 | Routery | 123/197.3 |
| 6,651,607 | B1 | | 11/2003 | Towler | 123/197.3 |
| 2004/0050046 | A1 | * | 3/2004 | Scuderi | 123/316 |

FOREIGN PATENT DOCUMENTS

KR   2003033528 A   *   5/2003

\* cited by examiner

*Primary Examiner*—Noah P. Kamen
(74) *Attorney, Agent, or Firm*—Thomte, Mazour & Niebergall; Shane M. Niebergall

(57) ABSTRACT

A novel engine is provided with a crankshaft that is offset from a centerline of the bore shaft, where a reciprocally sliding piston is disposed. A curved or angularly shaped connecting rod is pivotably connected to the piston at one end and to the crankshaft at the opposite end. The position of the crankshaft and the shape of the connecting rod maximize the travel of the connecting rod through the piston stroke in relation to the overall size of the connecting rod. The design permits maximum compression to be achieved after the top dead center of the crankshaft to further promote engine efficiency.

9 Claims, 4 Drawing Sheets

CONNECTING ROD AND CRANKSHAFT ASSEMBLY FOR AN ENGINE

BACKGROUND OF THE INVENTION

1. Field of the Invention

The present invention relates to engines and more particularly to an engine having at least one curved or angular connecting rod that couples at least one piston to a crankshaft, which is offset from a centerline that extends through the piston bore.

2. Description of the Prior Art

Engines of having various designs and configurations power automobiles, lawn mowers, generators, compressors, and more. Most internal combustion engines are comprised of similar components, which typically include a block, a crankshaft, a piston and a connecting rod that couples the piston with the crankshaft. The connecting rod is crucial in that it transfers the reciprocating power of the piston to the rotating crankshaft. The most common connecting rod design is straight, rotatably connected at one end to a wrist pin in the piston and at the other end to a crankpin on the crankshaft. Many prior art engine designs have attempted to increase efficiency and power by altering the length and configuration of the connecting rods.

One prior art engine design uses a compound connecting rod having separate upper and lower connecting rod sections that are pivotably coupled to one another at one end. The opposite ends of the rod sections are coupled to the piston and crankshaft. A separate sleeve is disposed beneath the piston and is attached to the lower rod section at a pivot point. This design provides an improved level of engine efficiency but increases the overall number of component parts and the likelihood of mechanical failure. Moreover, the complex geometry and multiple pivot points of the compound linkage create increased manufacturing and maintenance costs.

Other prior art designs attempt to increase the functional length of the connecting rods by slidably mounting a piston slide within the piston skirt or in the piston crown. This arrangement provides a pivot point for the connecting rod that is independent of the piston wrist pin and compensates for cyclic changes in the connecting rod effective length. However, much like the compound connecting rods, this connecting rod design is overly complex, suffering from manufacturing and maintenance costs that outweigh the benefits gained in power and efficiency. Reliability of an engine is oftentimes more important than modest gains in performance.

Accordingly, what is needed is an engine design that provides increased levels of efficiency and power without increasing relative manufacturing and maintenance costs or decreasing reliability. Such an engine design should also be able to provide desired output ranges with a reduced overall engine size.

SUMMARY OF THE INVENTION

The engine assembly of the present invention is generally provided with a block having at least one cylinder, a crankshaft rotatably coupled with said block, a piston slidably disposed within the cylinder, and a connecting rod that couples the piston to the crankshaft. The connecting rod is provided with an elongated body portion that extends between opposite ends. The body of the connecting rod has at least one bend along its length so that a portion of the centerline of the body is angularly and laterally spaced from an axis that extends through the opposite ends of the connecting rod. In a preferred embodiment, the crankshaft is rotatably coupled with the block so that the centerline of said crankshaft is horizontally spaced from a bore centerline of the cylinder. The displaced position of the crankshaft works in concert with the bend in the connecting rod to maximize the effective length of the connecting rod and produce a maximum compression just past top dead center.

It is therefore a principal object of the present invention to provide an engine having angular or curved connecting rods that maximize the power and efficiency of the engine by maximizing the effective length of the connecting rod.

A further object of the present invention is to provide an engine that combines curved or angular connecting rods with a crankshaft that is displaced from a centerline of the engine's piston bore to maximize the effective length of the connecting rods.

Still another object of the present invention is to provide an engine having one-piece, angular or curved connecting rods that permit the engine to be arranged in an inline, "V" or opposed cylinder configuration.

Yet another object of the present invention is to provide an engine having increased overall efficiency and reduced overall size.

A further object of the present invention is to provide an engine having an increased overall efficiency that is simple in design.

Still another object of the present invention is to provide an engine having an increased overall efficiency with relatively low manufacturing and maintenance costs.

These and other objects of the present invention will be apparent to those having skill in the art.

DESCRIPTION OF THE PREFERRED EMBODIMENT

Figure 1:
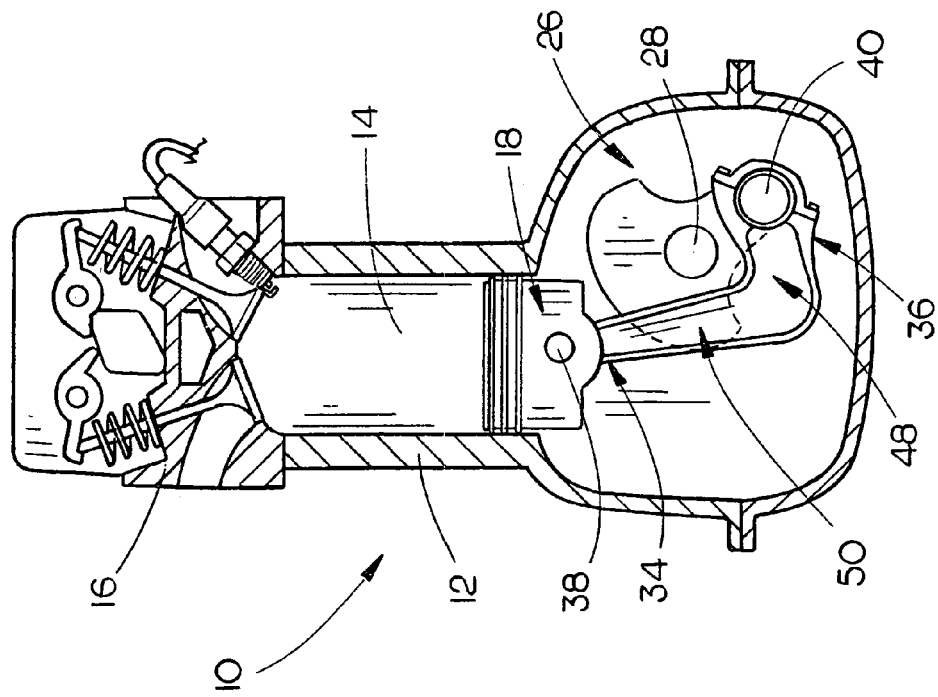
FIG. 1 is a front elevation view of one preferred embodiment of an engine of the present invention having a connecting rod and offset crankshaft assembly as the same could be positioned toward the beginning of a power stroke.
Figure 2:
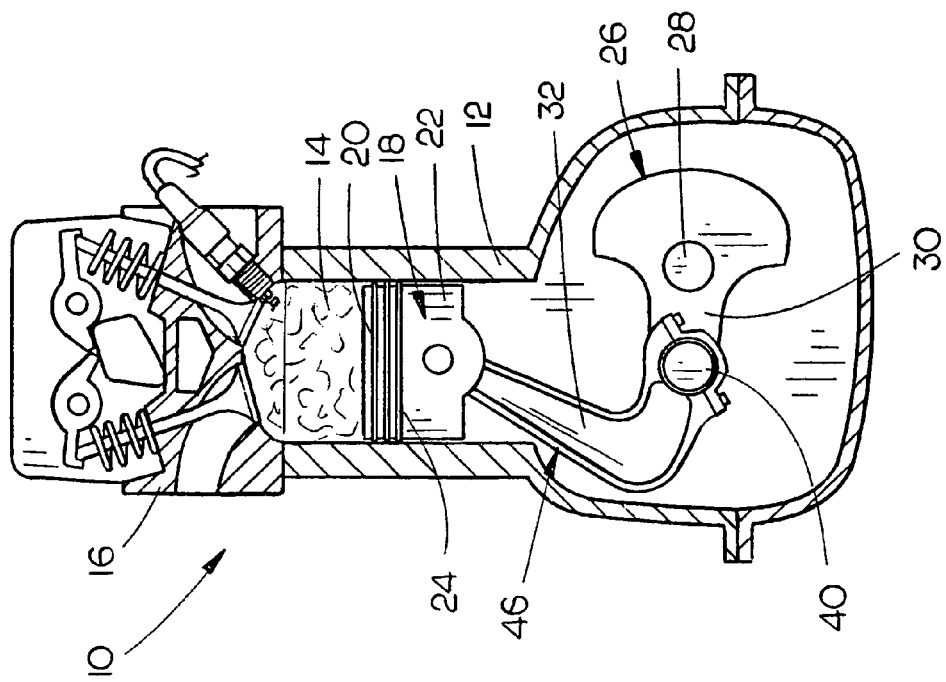
FIG. 2 is a front elevation view of the engine depicted in FIG. 1 as the connecting rod and crankshaft assembly could be positioned near bottom dead center.
Figure 3:
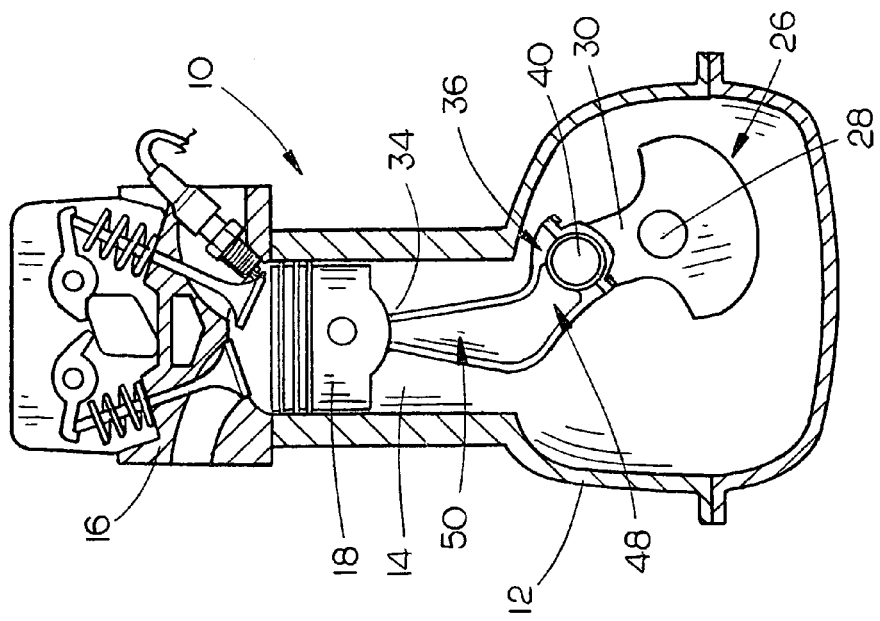
FIG. 3 is a front elevation view of the engine depicted in FIG. 1 as the connecting rod and crankshaft assembly could be positioned toward the beginning of an exhaust stroke.
Figure 4:
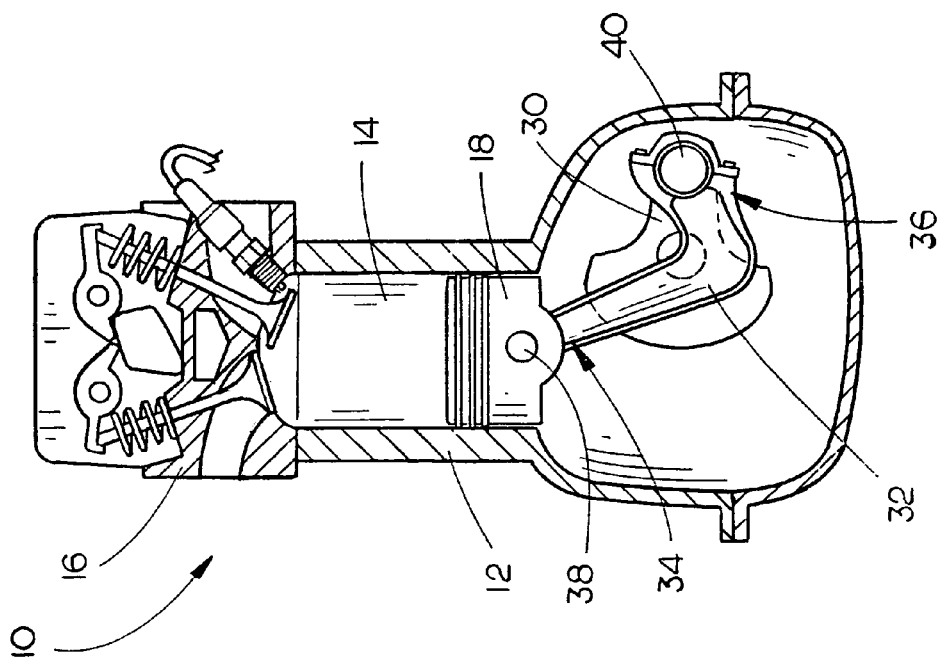
FIG. 4 is a front elevation view of the engine depicted in FIG. 1 as the connecting rod and crankshaft assembly could be positioned near top dead center.
Figure 5:
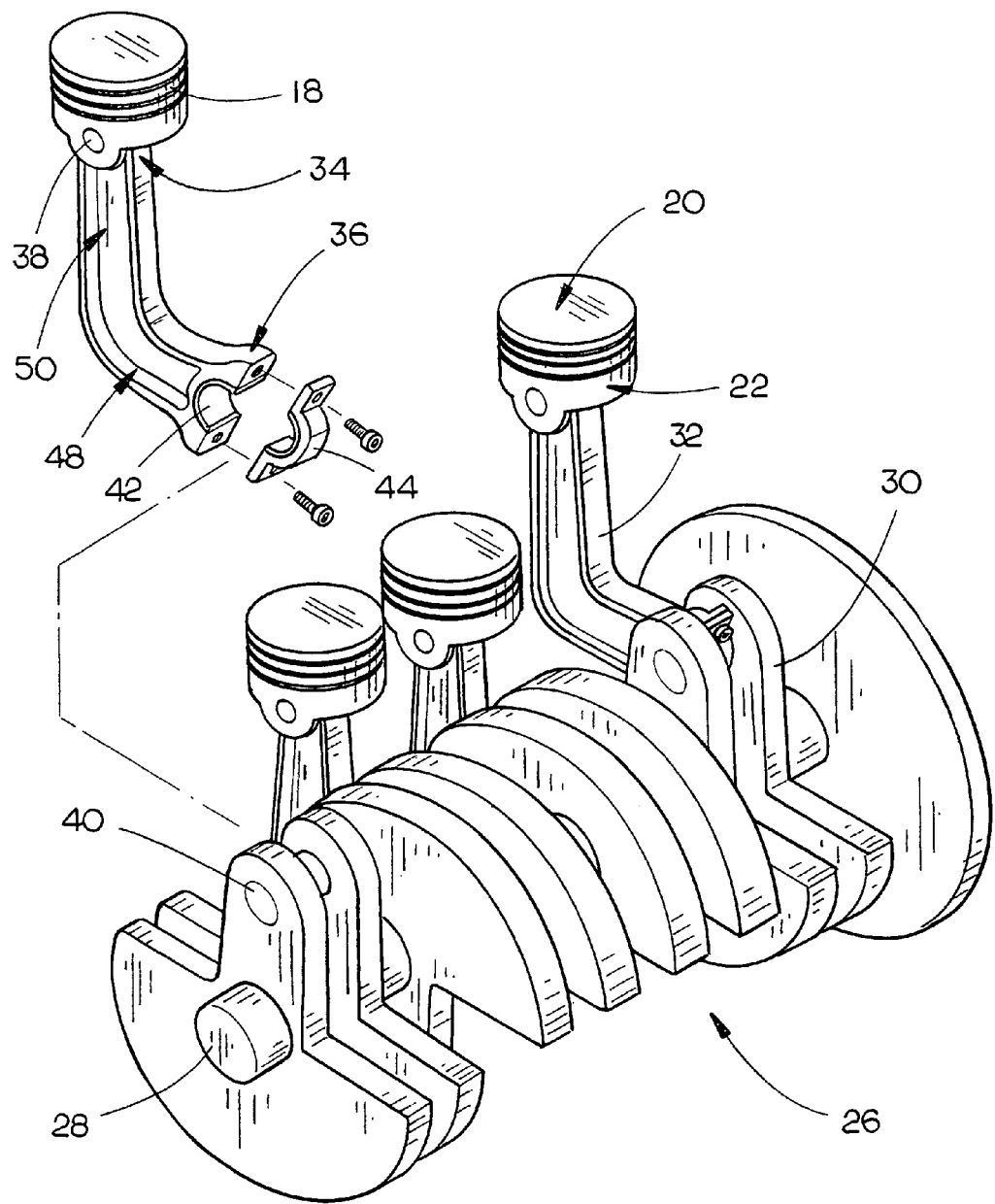
FIG. 5 is an isometric, partially disassembled view of one embodiment of a piston, connecting rod and crankshaft assembly of the present invention.
Figure 6:
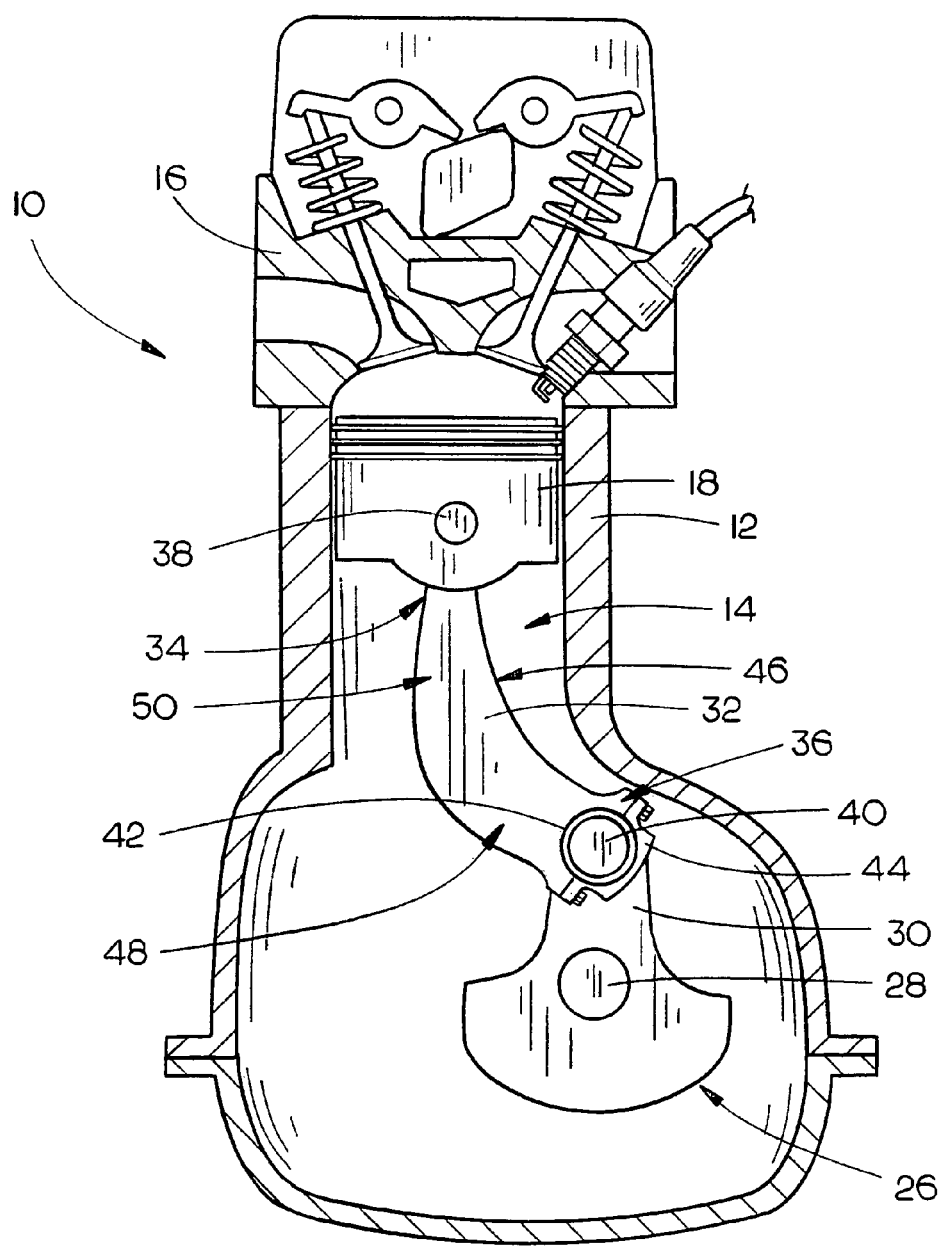
FIG. 6 is a front elevation view of another preferred embodiment of an engine of the present invention having a curved connecting rod and offset crankshaft assembly, as the same could be positioned near top dead center.

In the following detailed description of exemplary embodiments, reference is made to accompanying FIGS. 1–6, which form a part hereof and show, by way of illustration, exemplary embodiments of the present invention. These embodiments are disclosed in sufficient detail to enable those skilled in the art to practice the invention. It is to be understood that other embodiments may be utilized, however, and other changes may be made without departing from the spirit or scope of the present invention. The following detailed description is, therefore, not to be taken in a limiting sense in that the scope of the present invention is defined only by the appended claims.

The engine 10 of the present invention is generally provided with a block 12 having at least one cylinder 14, which is defined by interior walls of the block 12 and a cylinder head 16. For ease of explanation only, the engine 10 will be described as having a single cylinder. However, it is contemplated that the present invention will also apply to engines having multiple cylinders and various configurations thereof. For example, the engine 10 of the present invention could be provided in the form of a multi-cylinder inline engine, a V configuration engine, or an opposed cylinder engine.

A piston 18 is slidably disposed within the cylinder 14. The piston 18 may be of typical configuration, having a crown 20 and a piston skirt 22. Accordingly, depending upon the particular application in which the engine 10 will function, piston rings 24 of various configurations may be employed for a ceiling engagement between the piston 8 and the walls of the cylinder 14. However, other methods of providing a sufficiently sealed engagement are contemplated.

A crankshaft 26 is rotatably coupled with the block 12 and is provided with a main 28 that extends along a centerline of the crankshaft 26. At least one crankarm 30 extends radially from the crankshaft 26. In a preferred embodiment, the crankshaft is positioned with respect to the block 12 so that the main 28, or centerline, of the crankshaft 26 is horizontally spaced from a centerline of the bore of the cylinder 14. Examples of this configuration are depicted in FIGS. 1–4 and 6. The displacement of the crankshaft's 26 centerline from the centerline of the cylinder 14 may be accomplished with minor design modifications to inline engine blocks, V configured engine blocks and even opposed cylinder engine blocks.

A connecting rod 32, having a first end portion 34 and a second end portion 36 is provided for operatively coupling the piston 18 with the crankshaft 26. Specifically, the first end portion 34 of the connecting rod 32 is rotatably coupled with the piston 18. In one preferred embodiment, the first end portion 34 is rotatably coupled to a wrist pin 38 that extends through the piston skirt of the piston 18. However, it is contemplated that a similarly structured, rotatable connection may be provided using other forms of connectors and may even be rotatably coupled within the piston crown 20. The second end portion 36 of the connecting rod 32 is rotatably coupled, in a preferred embodiment, with a crankpin 40 that is disposed at the distal end of the crankarm 30. In this structural arrangement, bearings 42 and caps 44 are contemplated but may be replaced by equivalently functioning structures. For example, the second end portion 36 may be provided in a one-piece construction.

A body portion 46 of the connecting rod 32 extends between the first end portion 34 and the second end portion 36. The body portion 46 is provided with at least one bend along its length so that a centerline of the body portion 46 is angularly and laterally spaced from an axis that extends through the first end portion 34 and the second end portion 36. Preferably, the displacement of the body portion's 46 centerline from the axis extending between the opposite ends of the connecting rod 32 occurs at least adjacent the apex of the bend. It is contemplated that the bend in the body portion 46 could be angular, as depicted in FIGS. 1–5. The specific angle may range from obtuse to acute and will depend upon the configuration of the block 12 and the desired application for the engine 10. Other considerations will certainly include the shape and configuration of the components to the crankshaft 26. In an alternate embodiment, depicted in FIG. 6, the bend may be relatively smooth and curved in nature.

In a preferred embodiment, the connecting rod 32 and the crankshaft 26 are shaped and coupled with one another so that the piston 18 is cycled through a reciprocating piston stroke, having a predefined distance, as the crankshaft 26 is rotated. In a preferred embodiment, the bend in the body portion 46 of the connecting rod 32 defines a base leg 48 that extends from the second end portion 36 to the apex of the bend and a main leg 50 that extends from the first end portion 34 to the apex of the bend. The base leg 48 and main leg 50 are preferably formed to be rigidly adjoined to one another adjacent the apex of the bend. Accordingly, a one-piece construction is contemplated between the base leg 48 and main leg 50, but is not crucial, so long as they are rigidly joined to one another. In one preferred embodiment, the base leg 48 is provided with a length that approximates half the distance of the piston stroke. Likewise, the crankarm 30 could be provided with a length that approximates half the distance of the piston stroke. Where both the crankarm 30 and the base leg 48 are provided in this manner, their combined lengths will approximate the total length or distance of the piston stroke. Changes to the lengths of either or both of the crankarm 30 and the base leg 48 are contemplated in order to accommodate different configurations of the engine block 12 or other relevant design aspects dictated by the application chosen for the engine 10.

One preferred configuration for the engine 10 is depicted in FIGS. 1–4 as the engine 10 is cycled from the beginning portion of a power stroke through a beginning portion of an exhaust stroke. In this manner the shape of the connecting rod 32, the displaced position of the crankshaft 26 and their structural orientation with one another can be easily viewed. The advantages of these arrangements will be clear to those of skill in the art. For example, FIG. 4 demonstrates that, in a preferred embodiment, top dead center of the piston 18 occurs after the top dead center (or point of maximum elevation of the crankarm 30) of the crankshaft 26, thereby providing an increased effective momentarm of the crankarm 30 throw at the moment of combustion and maximum pressure within the cylinder 14. The effective momentarm of the crankarm 30 is longer during the initial combustion period when maximum cylinder pressure is experienced. Accordingly, mechanical and thermodynamic efficiency are increased along with the torque, as measured at the crankshaft 26. The shape of the body portion 46 of the connecting rod 32 further extends the period of high compression, or dwell, due to the fact that the piston 18 will tend to "stall" in its positions of top dead center and bottom dead center. Accordingly, overall efficiency of the engine 10 is improved by ensuring that the fuel is more completely burned and exhaust gases are more completely expelled from the cylinder 14. The engine 10 will also tend to operate more quietly and produce less pollutants due to the constant volume burn achieved by the geometry and orientation of the connecting rod 32 and the crankshaft 26.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. An engine assembly, comprising:
   a block having at least one cylinder;
   a crankshaft, rotatably coupled with said block, having a main that extends along a centerline of said crankshaft and at least one crankarm extending radially from said crankshaft;
   at least one piston slidably disposed within said at least one cylinder; and
   at least one connecting rod having a first end portion that is operatively pivotably coupled with said piston, a second end portion that is operatively pivotably coupled with a distal end portion of said crankarm, and an elongated body portion that extends between said first and second end portions;
   said body portion of said connecting rod having at least one bend along its length so that a centerline of said body is angularly and laterally spaced from an axis, extending through said first and second end portions, at a point adjacent an apex of the bend;
   said bend in said body portion defining a base leg of said body portion that extends from said second end portion of said body portion and a main leg of said body portion that extends from said first end portion of said body portion; said base leg and said main leg being rigidly adjoined to one another at an approximate apex of said bend;
   said connecting rod and said crankshaft being shaped and coupled with one another so that said piston is cycled through a piston stroke having a predefined distance, as said crankshaft is rotated; said crankarm having a length that approximates half the distance of said piston stroke.

2. The engine of claim 1 wherein the base leg of said connecting rod has a length that approximates half the distance of said piston stroke.

3. An engine assembly, comprising:
   a block having at least one cylinder;
   a crankshaft, rotatably coupled with said block, having a main that extends along a centerline of said crankshaft and at least one crankarm extending radially from said crankshaft;
   at least one piston slidably disposed within said at least one cylinder; and
   at least one connecting rod having a first end portion that is operatively pivotably coupled with said piston, a second end portion that is operatively pivotably coupled with a distal end portion of said crankarm, and an elongated body portion that extends between said first and second end portions;
   said body portion of said connecting rod having at least one angularly shaped bend along its length so that a centerline of said body is angularly and laterally spaced from an axis, extending through said first and second end portions, at a point adjacent an apex of the bend;
   said crankshaft being rotatably coupled with said block so that the centerline of said crankshaft is horizontally spaced from a bore centerline of said cylinder;
   said bend in said body portion defining a base leg of said body portion that extends from said second end portion of said body portion and a main leg of said body portion that extends from said first end portion of said body portion; said base leg and said main leg being rigidly adjoined to one another at an approximate apex of said bend;
   said connecting rod and said crankshaft being shaped and coupled with one another so that said piston is cycled through a piston stroke having a predefined distance, as said crankshaft is rotated; said crankarm having a length that approximates half the distance of said piston stroke.

4. The engine of claim 3 wherein the base leg of said connecting rod has a length that approximates half the distance of said piston stroke.

5. The engine of claim 4 wherein said connecting rod and said crankshaft are shaped and coupled with one another so that said piston is cycled through a piston stroke having a predefined distance, as said crankshaft is rotated; the base leg of said connecting rod having a length that approximates half the distance of said piston stroke.

6. An engine assembly, comprising:
   a block having at least one cylinder;
   a crankshaft, rotatably coupled with said block, having a main that extends along a centerline of said crankshaft and at least one crankarm extending radially from said crankshaft;
   at least one piston slidably disposed within said at least one cylinder; and
   at least one connecting rod having a first end portion that is operatively pivotably coupled with said piston, a second end portion that is operatively pivotably coupled with a distal end portion of said crankarm, and an elongated body portion that extends between said first and second end portions;
   said body portion of said connecting rod having at least one curved bend along its length so that a centerline of said body is angularly and laterally spaced from an axis, extending through said first and second end portions, at a point adjacent an apex of the bend;
   said crankshaft being rotatably coupled with said block so that the centerline of said crankshaft is horizontally spaced from a bore centerline of said cylinder;
   said bend in said body portion defining a base leg of said body portion that extends from said second end portion of said body portion and a main leg of said body portion that extends from said first end portion of said body portion; said base leg and said main leg being rigidly adjoined to one another at an approximate apex of said bend;
   said connecting rod and said crankshaft being shaped and coupled with one another so that said piston is cycled through a piston stroke having a predefined distance, as said crankshaft is rotated; said crankarm having a length that approximates half the distance of said piston stroke.

7. The engine of claim 6 wherein the base leg of said connecting rod has a length that approximates half the distance of said piston stroke.

8. The engine of claim 7 wherein said connecting rod and said crankshaft are shaped and coupled with one another so that said piston is cycled through a piston stroke having a predefined distance, as said crankshaft is rotated; the base leg of said connecting rod having a length that approximates half the distance of said piston stroke.

9. An engine assembly, comprising:

a block having at least one cylinder;

a crankshaft, rotatably coupled with said block, having a main that extends along a centerline of said crankshaft and at least one crankarm extending radially from said crankshaft;

at least one piston slidably disposed within said at least one cylinder; and at least one connecting rod having a first end portion that is operatively pivotably coupled with said piston, a second end portion that is operatively pivotably coupled with a distal end portion of said crankarm, and an elongated body portion that extends between said first and second end portions;

said body portion of said connecting rod having at least one bend along its length so that a centerline of said body is angularly and laterally spaced from an axis, extending through said first and second end portions, at a point adjacent an apex of the bend;

said bend in said body portion defining a base leg of said body portion that extends from said second end portion of said body portion and a main leg of said body portion that extends from said first end portion of said body portion; said base leg and said main leg being rigidly adjoined to one another at an approximate apex of said bend;

said connecting rod and said crankshaft being shaped and coupled with one another so that said piston is cycled through a piston stroke having a predefined distance, as said crankshaft is rotated; and the base leg of said connecting rod having a length that approximates half the distance of said piston stroke.

* * * * *